V. A. FYNN.
ALTERNATING CURRENT MOTOR CONTROL.
APPLICATION FILED MAY 13, 1912.

1,072,445.

Patented Sept. 9, 1913.

2 SHEETS—SHEET 1.

WITNESSES:
Chas. A. Becker,
G. M. Shore

INVENTOR
Valire A. Fynn
BY
E. E. Huffman
ATTORNEY

V. A. FYNN.
ALTERNATING CURRENT MOTOR CONTROL.
APPLICATION FILED MAY 13, 1912.

1,072,445.

Patented Sept. 9, 1913.

2 SHEETS—SHEET 2.

WITNESSES:
Chas. A. Becker.

INVENTOR
Valère A. Fynn
BY E. E. Huffman
ATTORNEY

UNITED STATES PATENT OFFICE.

VALÈRE ALFRED FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

ALTERNATING-CURRENT-MOTOR CONTROL.

1,072,445.  Specification of Letters Patent.  Patented Sept. 9, 1913.

Application filed May 13, 1912. Serial No. 697,049.

*To all whom it may concern:*

Be it known that I, VALÈRE ALFRED FYNN, a subject of the King of England, residing at St. Louis, Missouri, United States of America, have invented a certain new and useful Alternating-Current-Motor Control, of which the following is such a full, clear, and exact description as will enable any one skilled in the art to which it appertains to make and use the same, reference being had to the accompanying drawings, forming part of this specification.

My invention relates to alternate current motors and particularly to means for automatically reorganizing the circuits of a single-phase motor when the speeds falls below, or exceeds a certain value.

Broadly speaking, my invention consists in deriving from the motor a plurality of E. M. F.'s, the phase relation of which varies rapidly with varying speed, and impressing these E. M. F.'s on a suitably constructed polyphase relay. In the preferred form of my invention, I so select said E. M. F.'s that their phase difference is small when the motor speed is low, but increases with increasing motor speed. These E. M. F.'s may be obtained from the stator, or from the rotor, or from both, and may be derived from selected motor windings, or from one or more suitably disposed auxiliary windings.

Figure 1:
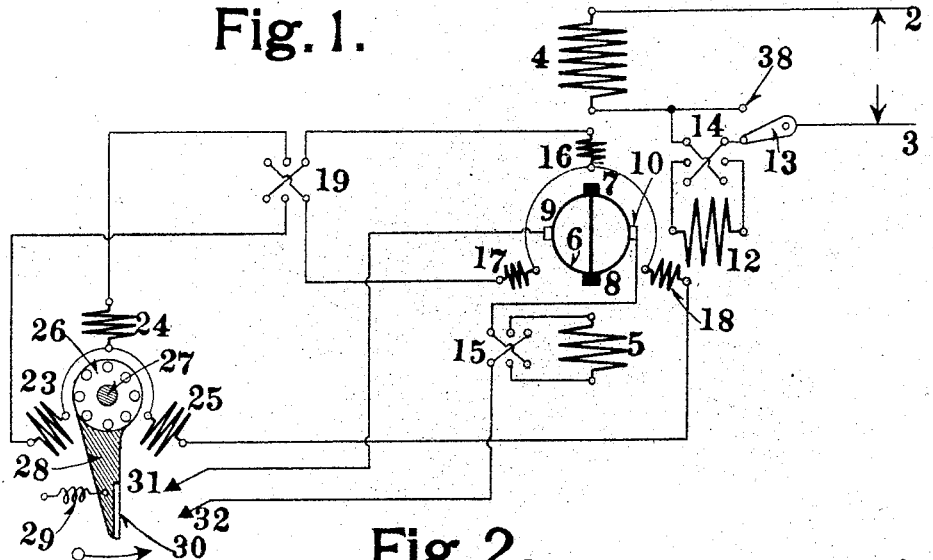
Figure 2:
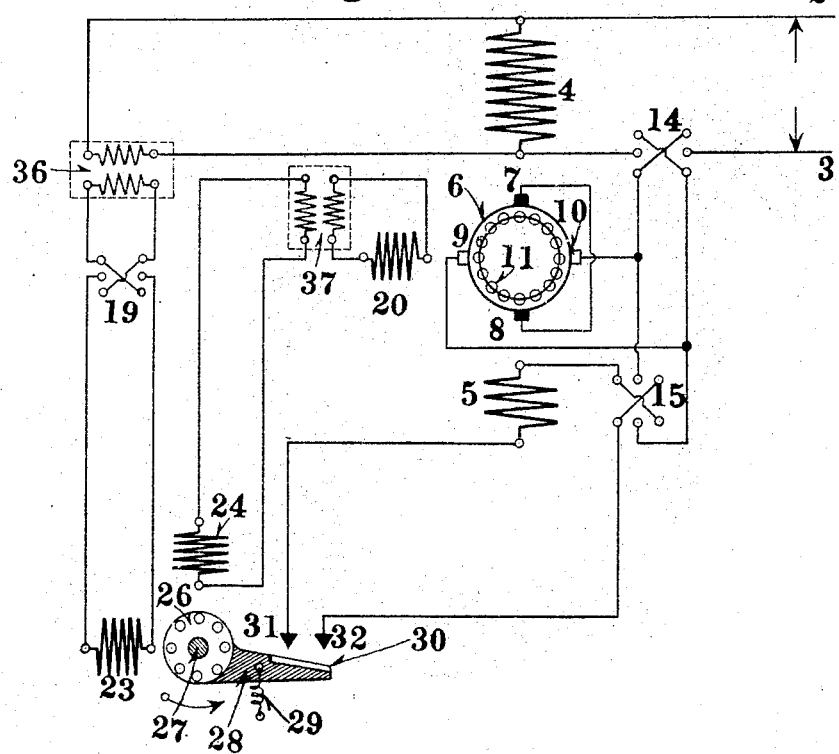
Figure 3:
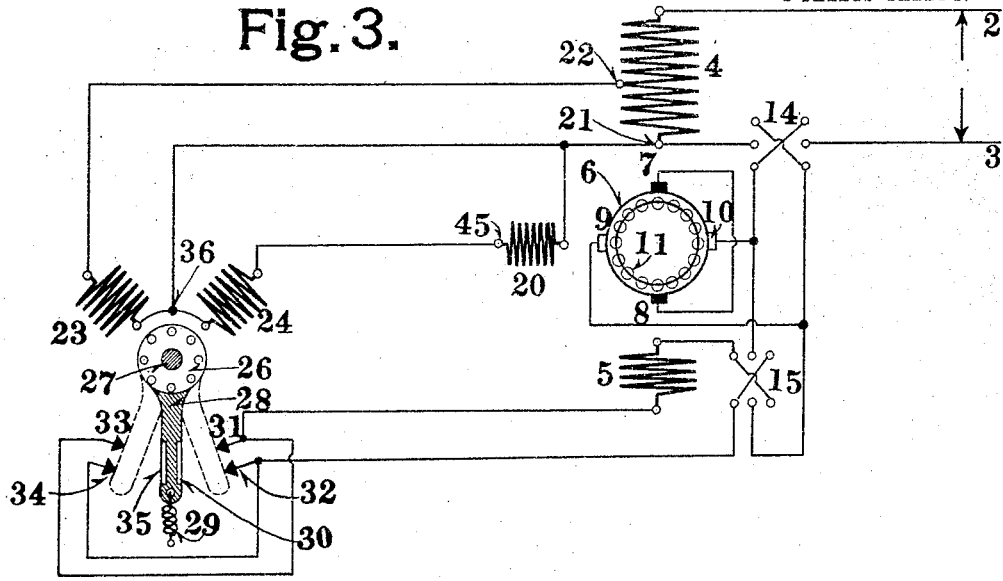
Figure 4:
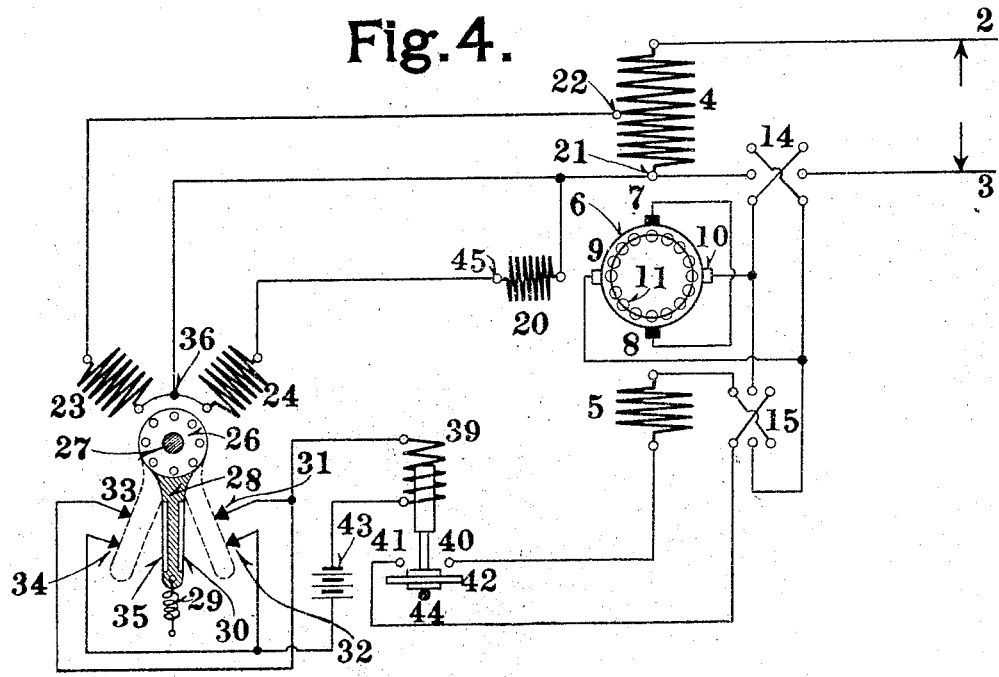

In the accompanying drawings, Figure 1 shows a single-phase commutator motor, the stator of which is provided with a special three-phase relay winding. Fig. 2 shows a commutator motor in which the rotor also carries a squirrel cage and the stator is provided with only one auxiliary winding. Fig. 3 shows a motor similar to that of Fig. 2, but in which only part of the main stator winding is utilized for the purpose of feeding the relay. Fig. 4 is similar to Fig. 3, but the polyphase relay closes the compensating circuit through the agency of an auxiliary relay.

Fig. 1 diagrammatically indicates a single-phase two-pole commutator motor adapted to start as a separately excited series induction machine, and to operate as a self-excited and artificially compensated induction motor with shunt characteristic. The main stator winding of this motor is shown at 4 and is adapted to be connected, at starting, to the field winding 12, also disposed on the stator and displaced from 4. The compensating winding 5 is disposed coaxially with the main inducing winding 4, and the stator also carries an auxiliary three-phase stator winding 16, 17, 18. The rotor is provided with a commuted winding 6 short-circuited along the axis of the main inducing winding 4 by means of the brushes 7, 8, and adapted to be connected to the compensating winding 5 by means of the exciting brushes 9, 10. The relay to be operated by the auxiliary windings 16, 17, 18, is provided with three inducing windings 23, 24, 25, disposed on the stationary member, and a movable member provided with a squirrel-cage winding 26 and pivoted on the shaft 27 and carrying the arm 28 provided with a conducting plate 30 and controlled by the spring 29. This spring 29 tends to keep the conducting plate 30 away from the contacts 31, 32, which, when short-circuited, close the exciting circuit of the motor comprising the exciting brushes 9, 10, and the compensating winding 5. The reversing switch 19, located between the auxiliary motor windings 16, 17, 18, and the stator windings of the polyphase relay, enables the direction of the torque exerted by the relay armature 26 to be changed. The reversing switch 15, located within the exciting circuit, enables the direction of the compensating E. M. F. derived from 5 to be adapted to the direction of the rotation of the motor. The switch 13, which may be referred to as the starting switch, either connects the line 3 directly to the main stator winding 4, or by way of the starting or field winding 12. In the position shown in Fig. 1, the winding 12 is in circuit with the winding 4 and the motor will start in one or the other direction, according to the position of the reversing switch 14. If it be desired to cut the starting winding out of circuit after the machine has reached its full speed, then switch 13 should be moved to point 38. It is known that the motor shown in Fig. 1 will retain its series characteristic as long as the rotor exciting circuit remains open; and the purpose of the polyphase relay, in this particular case, is to automatically close this rotor exciting circuit at a selected speed. To this end, said relay is connected to the auxiliary stator windings 16, 17, 18, in such manner that the relay armature 26 is impelled to move the plate 30 into contact with the points 31 and 32, and the arrangement is such that the torque exerted by the armature 26 will only reach a value sufficient to overpower the spring 29 after the motor has attained a certain speed.

When the motor is first connected to the line 2, 3, the main stator winding 4 transfers energy to the rotor inductively by means of a transformer flux which appears along the axis of 4, while the field winding 12 produces, along an axis displaced from the former, a flux which may be referred to as motor flux, and which is directly responsible for the motor torque. At starting, these two fluxes, namely, the transformer and the motor flux, are very nearly of the same phase, but as the speed of the motor increases, the phase difference between the two fluxes also increases, and, theoretically, should become exactly equal to 90 degrees as soon as the synchronous speed has been reached. In practice, this ideal condition is seldom, if ever, attained, but the phase difference between the two fluxes does increase with increasing speed and does reach a value in the neighborhood of 90 degrees at synchronism. This being the case, it will be seen that the E. M. F.'s induced in the three auxiliary stator windings 16, 17 and 18 will, at first, all be of practically the same phase, for the reason that a purely oscillating alternate-current field is present in the motor; but, near synchronism, this oscillating field will be replaced by a rotating one and the E. M. F.'s induced in said three windings will be displaced in phase by such angles as correspond to their space displacement on the stator. As long as the E. M. F.'s in the windings 16, 17 and 18 are nearly of the same phase, no appreciable torque will be exerted by the armature 26 of the polyphase relay, but this torque will increase with increasing phase difference between said E. M. F.'s and will reach a maximum when a perfect rotating field is present in the motor from which the polyphase relay is fed. I have found that the difference in phase between the transformer and the motor flux increases slowly at first, but that this increase becomes much more rapid as synchronism is approached. This condition is of material help in securing a positive operation of the relay. For the conditions indicated in Fig. 1, the three-phase relay should preferably be so adjusted that the contacts 31 and 32 are bridged when the motor has come to within 20 or 25% of its synchronous speed. As soon as 31 and 32 are connected by the plate 30, the motor assumes a shunt characteristic and the winding 5 provides the artificial compensation. After the three-phase relay has operated, switch 13 can, if desired, be moved to point 38, but this is by no means necessary. It is clear that the position of the auxiliary windings 16, 17 and 18 relatively to the already existing stator windings is quite immaterial. I have also observed that the E. M. F. induced in an auxiliary winding such as 16, is of approximately the same phase as that of the E. M. F. appearing in a coaxial motor winding, and it is, therefore, possible in some cases to make use of a motor winding instead of an auxiliary winding which, if used, would be coaxially disposed with said motor winding. Such an arrangement is illustrated in Fig. 2.

The motor shown in Fig. 2 comprises a main inducing winding 4 and a coaxial compensating winding 5, both disposed on the strator. The rotor carries a commuted winding 6 and a squirrel-cage 11. The commuted winding is short-circuited by means of the brushes 7, 8, along the line of magnetization produced by the main inducing winding 4; and the exciting brushes 9, 10, displaced from the short-circuited brushes 7, 8, are adapted to be connected in series with the main inducing winding 4 at starting, and to the compensating winding 5 after a sufficient speed has been reached. The stator of this motor also carries a relay winding 20. The relay itself is of the two-phase type provided with the inducing windings 23, 24, and a squirrel-cage armature 26 carrying a spring controlled lever 28 adapted to connect the contacts 31, 32, thus giving the machine a shunt characteristic by closing the compensating circuit. This two-phase relay is fed by two E. M. F.'s derived from the motor. One of these E. M. F.'s is derived from the terminals of the main inducing winding 4 by means of the transformer 36. Its direction can be changed by means of the reversing switch 19. The other E. M. F. is derived from the relay winding 20 by means of the transformer 37.

In order to start the motor of Fig. 2, the reversing switch 14 is thrown in the one or the other direction, thus connecting the line to the main inducing winding 4 and to the exciting brushes 9, 10, of the rotor and placing the latter in series with the main inducing winding. The direction in which the reversing switch 14 is thrown determines the direction of the current through the rotor along the exciting axis 9, 10, and therefore, determines its direction of rotation. If it be desired to improve the power factor of this machine and to keep its speed near the synchronous, then the compensating circuit should be closed at the points 31, 32, after the reversing switch 15 has been thrown in the correct direction. This reversing switch 15 changes the terminals of the compensating winding 5 relatively to the exciting brushes 9, 10, and should be thrown in one direction for a clockwise rotation and in the opposite direction for a counterclock rotation of the rotor. It is best for this switch 15 to be thrown in the correct direction simultaneously with the starting switch 14, in which case, the relay will automatically perform the only remaining operation, namely, that of interconnecting the points 31, 32. The torque exerted by the armature 26 of the two-phase relay is very small at starting because the magnetic flux appearing in the motor along the axis of 4 is very nearly of the same phase as the magnetic flux appearing in said motor along the axis of 20. As the rotor speed increases, the phase difference between these two fluxes also increases, thus increasing the phase difference between the E. M. F.'s impressed on the inducing windings 23, 24, of the two-phase relay. When the rotor 6 has reached a nearly synchronous speed, this phase difference is quite large. The successful operation of the relay, however, not only depends on a sufficient difference of phase between the two motor fluxes, but also on their magnitude. In this respect, the presence of the squirrel-cage winding 11 is of material benefit in that it causes the magnitude of the flux along the axis 9, 10, of the motor to rise near synchronism to a value nearly equal to that of the flux appearing in the axis 7, 8, and due to the main inducing winding 4. For the reasons stated, as long as the rotor 6 is standing still, or revolving slowly, the relay exerts practically no torque, but, as the motor speed increases, both the magnitude of and the phase difference between the E. M. F.'s impressed on the relay increase, causing said relay to develop a rapidly increasing torque which eventually becomes sufficient to bring plate 30 into contact with the points 31, 32. The direction of the torque exerted by the relay armature 26 changes with a change in the direction of rotation of the motor. The reversing switch 19 is, therefore, provided for the purpose of keeping the relay torque in the same direction for both directions of rotation of the motor.

Fig. 3 differs from Fig. 2 in that the transformers 36 and 37 interposed between the motor windings and the relay have been omitted, and in that only part of the main inducing winding 4 is utilized for the purpose of feeding one of the relay windings. Furthermore, the direction of the torque exerted by the relay in Fig. 3 is allowed to change with the change in the direction of rotation of the motor, duplicate contacts 31, 32 and 33, 34, being provided at each side of the lever 28 controlled by the relay armature 26, with the result that the compensating circuit is closed by the relay regardless of the direction of the torque exerted by the latter.

In Fig. 4 is shown a modification of Fig. 3. In this arrangement, the polyphase relay does not close the compensating circuit directly, but does so through another relay which may be operated in any desired manner, either directly from the mains, or by means of a small storage battery 43, as shown in the figure. The object of this modification is to relieve the polyphase relay of as much work as possible. The current in the compensating or the exciting circuit of a single-phase motor is often large, making it necessary to provide heavy contacts 31, 32 and 33, 34. In order to insure a good contact between these heavy contacts and the correspondingly heavy plates 30 and 35, it would be necessary for the armature 26 to exert a powerful torque, thus making the polyphase relay unnecessarily large. This difficulty is avoided by using the polyphase relay as an intermediate relay, throwing the heavy duty on a relay such as 39 of Fig. 4, also the smaller the input into the polyphase relay, the smaller will be the influence of this relay on the operation of the motor with which it coöperates. After the exciting circuit of the motor described has been closed by means of the coöperating relay, and whether a compensating winding has been included in said circuit or not, the conditions of coöperation change to some extent. After the exciting circuit of the motor has been closed, the torque exerted by the relay becomes dependent on the load of the motor. When the motor runs light, the relay torque is generally in excess of the torque exerted by said relay during the starting operation, but diminishes with increasing load. When the motor becomes heavily overloaded, the relay torque diminishes sufficiently to open the exciting, or compensating circuit, thus reëstablishing the starting connection and placing the machine in a position to regain its proper speed as soon as the overload has been removed.

Having fully described my invention, what I claim as new and desire to secure by Letters Patent of the United States is:

1. The combination with a single-phase motor, of relay controlled means for reorganizing its circuits, and means for deriving a plurality of E. M. F.'s of differing phase from the motor and impressing said E. M. F.'s on the relay to produce a revolving field therein.

2. In a single-phase motor, the combination with an inducing member provided with a main inducing winding and an auxiliary winding displaced therefrom, of an induced member, a relay for reorganizing the circuits of the motor, and means for impressing on said relay a plurality of E. M. F.'s of differing phase, one of said E. M. F.'s being derived from the auxiliary winding.

3. The combination with a single-phase motor, of means dependent on the speed of said motor for generating a plurality of E. M. F.'s of differing phase, a polyphase relay, a switch controlled thereby for reorganizing the motor circuits and means for impressing the polyphase E. M. F.'s on the relay.

4. In a single-phase motor, the combination with an inducing member, of an induced member provided with two sets of brushes, one of said sets being in line with the magnetization produced by the inducing member, a switch in circuit with the other set of brushes, a polyphase relay controlling said switch, and means for deriving a plurality of E. M. F.'s of differing phase from the motor and impressing said E. M. F.'s on the relay.

5. In a single-phase motor, the combination with an inducing member provided with a main inducing winding, of an induced member closed along one axis, a switch and connections for closing it along another axis, a relay governing said switch, an auxiliary winding on the inducing member displaced from the main inducing winding, and means for impressing on the relay a plurality of E. M. F.'s of differing phase, one of said E. M. F.'s being derived from said auxiliary winding.

6. In combination, a single-phase motor having its armature short-circuited along one axis, a switch in circuit with the armature along another axis, a relay for operating said switch, a second switch in circuit with the relay of the first switch, a relay for operating the second switch, and means for impressing upon the second relay a plurality of E. M. F.'s of differing phase derived from the motor.

7. In a single-phase motor, the combination with an inducing member provided with a main inducing winding and an auxiliary winding displaced therefrom, of an inducing member, a relay connected to the main inducing winding and the auxiliary winding, and a switch for reorganizing the circuits of the induced member, said switch being controlled by the relay.

8. In a single-phase motor, the combination with an inducing member, of an induced member having a squirrel-cage winding and a commuted winding, a relay for reorganizing the circuits of the motor, and means for deriving a plurality of E. M. F.'s of differing phase from the motor and impressing said E. M. F.'s on the relay.

9. In a single phase motor, the combination with an inducing member provided with a main inducing winding and an auxiliary winding displaced therefrom, of an induced member having a squirrel-cage winding and a commuted winding, a relay for reorganizing the circuits of the motor and means for impressing on said relay a plurality of E. M. F.'s, one of said E. M. F.'s being derived from the auxiliary winding.

In testimony whereof, I have hereunto set my hand and affixed my seal in the presence of the two subscribing witnesses.

VALÈRE ALFRED FYNN. [L. S.]

Witnesses:
  W. A. ALEXANDER,
  G. M. SHORE.

---

Copies of this patent may be obtained for five cents each, by addressing the "Commissioner of Patents, Washington, D. C."